(12) United States Patent
Chao et al.

(10) Patent No.: US 9,728,999 B2
(45) Date of Patent: Aug. 8, 2017

(54) WIRELESSLY CHARGING A SECOND DEVICE FROM A FIRST DEVICE

(71) Applicant: Lenovo Enterprise Solutions (Singapore) Pte. Ltd., Singapore (SG)

(72) Inventors: David T W. Chao, Taipei (TW); Yao-Huan Chung, Taipei (TW); Tarek El-Houshy, Raleigh, NC (US); Eddie H N. Tseng, Taipei (TW); Yen P. Wang, Taipei (TW)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 190 days.

(21) Appl. No.: 14/468,404

(22) Filed: Aug. 26, 2014

(65) Prior Publication Data
US 2015/0077038 A1    Mar. 19, 2015

(30) Foreign Application Priority Data
Sep. 16, 2013    (TW) .............................. 102133480 A (51) Int. Cl.
| H02J 7/00 | (2006.01) |
| H02J 7/02 | (2016.01) |
| H02J 5/00 | (2016.01) |

(52) U.S. Cl.
CPC .............. *H02J 7/025* (2013.01); *H02J 5/005* (2013.01); *H02J 7/0054* (2013.01); *H02J 2007/0096* (2013.01)

(58) Field of Classification Search
CPC ....... Y02E 60/12; H02J 7/0054; H02J 7/1423; H02J 50/40; H01M 10/44; H01M 10/46

USPC ........................................................ 320/103
See application file for complete search history.

(56) References Cited

U.S. PATENT DOCUMENTS

| 6,297,729 | B1 | 10/2001 | Abali et al. | |
|---|---|---|---|---|
| 7,518,337 | B2 | 4/2009 | Beart et al. | |
| 8,280,453 | B2 | 10/2012 | Beart et al. | |
| 2009/0140691 | A1* | 6/2009 | Jung ....................... | H02J 7/025 320/108 |
| 2010/0148723 | A1 | 6/2010 | Cook et al. | |
| 2011/0260681 | A1* | 10/2011 | Guccione .............. | H02J 7/0054 320/108 |

(Continued)

FOREIGN PATENT DOCUMENTS

| CN | 102124624 A | 7/2011 |
|---|---|---|
| TW | M417716 | 12/2011 |

(Continued)

OTHER PUBLICATIONS

Search report "102133480", 1 page.
1042035050 "Office Action", 8 pages.

*Primary Examiner* — Arun Williams
(74) *Attorney, Agent, or Firm* — Jeffrey L. Streets (57) ABSTRACT

A mechanism is provided for a first device to wirelessly charge a second device. When in a first charging mode, the first device has a first chargeable radius as a charging radius thereof. An external power source is provided to the first device. In response to the external power source providing power to the first device, the first device changes from the first charging mode to a second charging mode. In response to the first device changing to the second charging mode, the charging radius of the first device changes from the first chargeable radius to a second chargeable radius.

20 Claims, 6 Drawing Sheets

(56) References Cited

U.S. PATENT DOCUMENTS

2012/0043931 A1* 2/2012 Terao ............... H02J 7/025
320/108
2012/0056579 A1* 3/2012 Kim ............... H02J 5/005
320/108

FOREIGN PATENT DOCUMENTS

TW          M457356        7/2013
WO     WO2009140222 A1   11/2009

* cited by examiner

WIRELESSLY CHARGING A SECOND DEVICE FROM A FIRST DEVICE

CROSS-REFERENCE TO RELATED APPLICATION

This application claims the benefit of Taiwan Patent Application Serial No. 102133480, filed on Sep. 16, 2013, which is hereby incorporated by reference for all purposes as if fully set forth herein.

BACKGROUND

The present invention relates generally to an improved data processing apparatus and method and more specifically to mechanisms for wirelessly charging a second device from a first device.

Portable devices, such as notebook computers, PDAs, tablet computers, and smartphones, are indispensable to individuals and enterprises nowadays. Battery service life is one of the limitations to portable devices. The need for various functions, enhancement of applicability, and different dimensions of portable device is addressed effectively with an important technical solution. That is, charging batteries of the portable devices so that the batteries have an acceptable length of service life. For example, after operating battery-powered portable devices for a long period of time, users have to charge the batteries before resuming the operation of the battery-powered portable devices with a view to minimizing the chance that the batteries will run out of power and thus interrupt the operation of the battery-powered portable devices.

One of the common ways to charge a portable device requires charging the portable device by a wired power source adapter. But wired power source adapters are useless in certain circumstances, such as an outdoor scenario and indoor power outage. Moreover, wired power source adapters reduce the portability of the portable devices.

Another common way to charge a portable device entails charging the portable device from a portable power source and typically transmitting electric power to the portable device by a USB cable. However, portable power sources are not only bulky and thus difficult to carry around, but are also disadvantaged by limited power capacity.

In this regard, a conventional wireless charging technique entails performing a charging process with a power transmitting board/base. Wireless charging, also known as non-contact charging, non-contact power transmission, and inductive charging, is a technique that involves transmitting energy between two devices by an electromagnetic field. Wireless charging-related techniques, such as charging power source-based power wireless transmission, and a power receiving circuit built in a portable device for performing wireless charging, are attributed to the prior art.

SUMMARY

The present invention provides a wireless electric charging technology whereby a device wirelessly charges a plurality of other devices. The technical solutions offered according to the present invention are advantageously characterized by ease of operation, ease of use, extreme environment-tolerant charging, and user-friendliness.

In an illustrative embodiment, the present invention provides a method for a first device to wirelessly charge a second device. The first device comprises a control module. When the first device is in a first charging mode, the first device has a first chargeable radius as a charging radius thereof. The method comprises: providing an external power source to the first device; changing from the first charging mode of the first device to a second charging mode of the first device, in response to the external power source supplying power to the first device; and changing the charging radius of the first device from the first chargeable radius to a second chargeable radius, in response to the first device being changed to the second charging mode.

In another illustrative embodiment, the present invention provides a charging device for use in wirelessly charging a second device. When the charging device is in a first charging mode, the charging device has a first chargeable radius as a charging radius thereof. The charging device comprises: an external power source; and a control module for enabling the charging device to change from the first charging mode to a second charging mode, in response to the external power source supplying power to the first device, wherein the control module enables the charging radius of the first device to change from the first chargeable radius to a second chargeable radius in response to the first device having changed to the second charging mode.

In yet another illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The following description, the appended claims, and the embodiments of the present invention further illustrate the features and advantages of the present invention.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a computer system, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer.

The present invention is described below with reference to flowchart illustrations and/or block diagrams of computer apparatus, methods and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
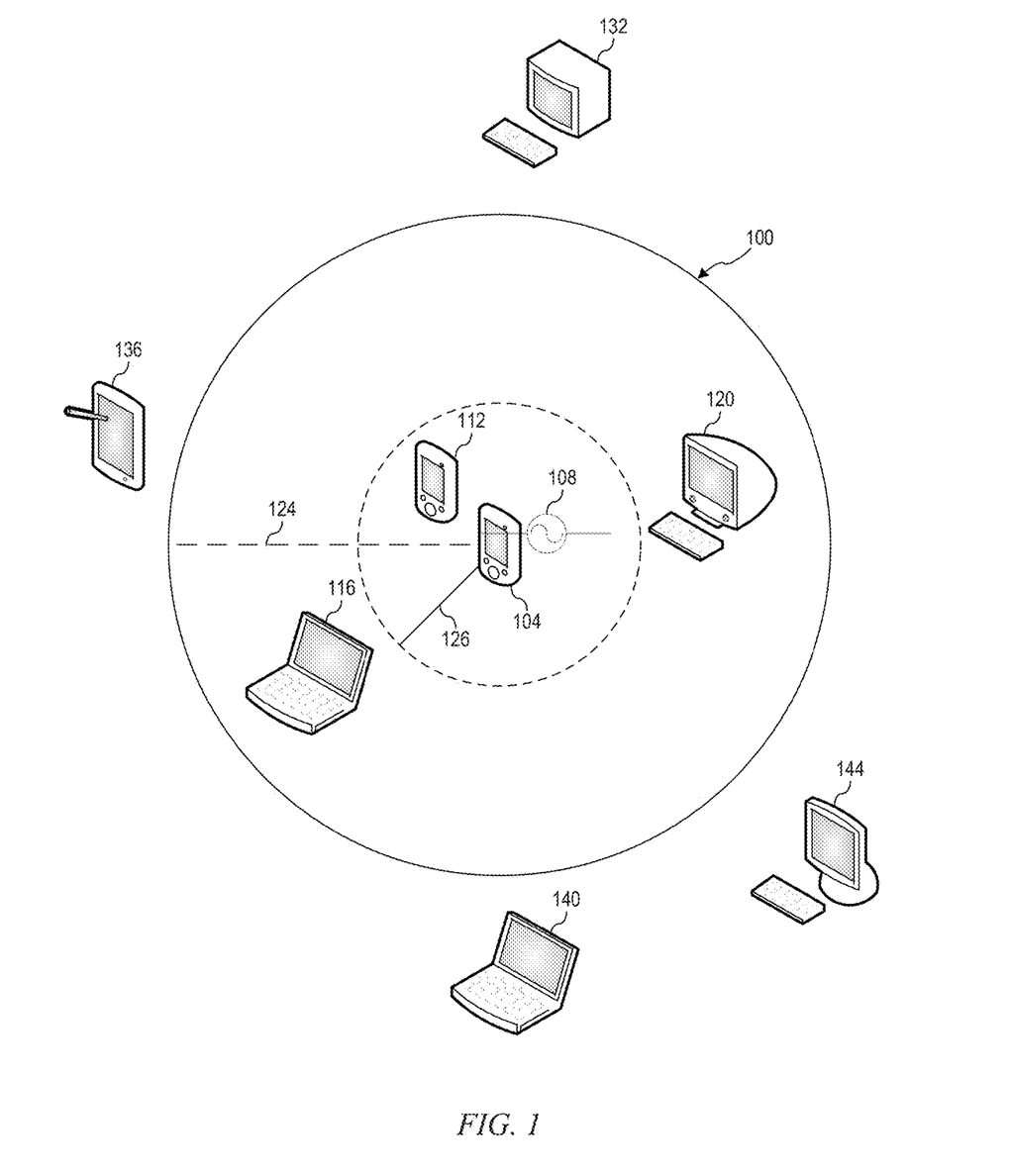
FIG. 1 is a schematic view of a wireless charging system according to an embodiment of the present invention.

A wireless electric charging is hereunder described and illustrated with FIG. 1 through FIG. 5 according to a preferred embodiment of the present invention. Referring to FIG. 1, there is shown a schematic view of a wireless charging system 100 according to a preferred embodiment of the present invention. As shown in FIG. 1, the wireless charging system 100 comprises a first device 104 and a second device 112. The first device 104 has a power source 108 for supplying power to the first device 104, such that the first device 104 can wirelessly charge the second device 112. Basically, the wireless charging involves a technology as follows: an electromagnetic field enables energy to be transmitted between two devices; an inductive component converts a voltage into a magnetic energy signal; and another inductive component receives the magnetic energy signal by means of induction and converts the magnetic energy signal into a voltage. For further information about wireless charging, refer to U.S. Pat. No. 7,518,337 and U.S. Pat. No. 8,280,453.

In a preferred embodiment of the present invention, the power source 108 is, for example, an alternating current (AC) power source provided, e.g., in the form of conventional grid electricity and through a power source socket (not shown). The preferred embodiment of the present invention is exemplified by a means of connection, which includes a power source cable (not shown) and a plug (not shown). After the plug has been plugged in the power source socket, the power source 108 supplies power to the first device 104. The power source socket is a socket embedded in a wall or a movable socket. Furthermore, the power source cable further comprises a power source conversion unit (not shown) for converting the voltage provided by the power source socket. The power source 108 is, for example, adapted to charge the first device 104 by means of wireless charging, but the present invention is not limited thereto.

Figure 2:
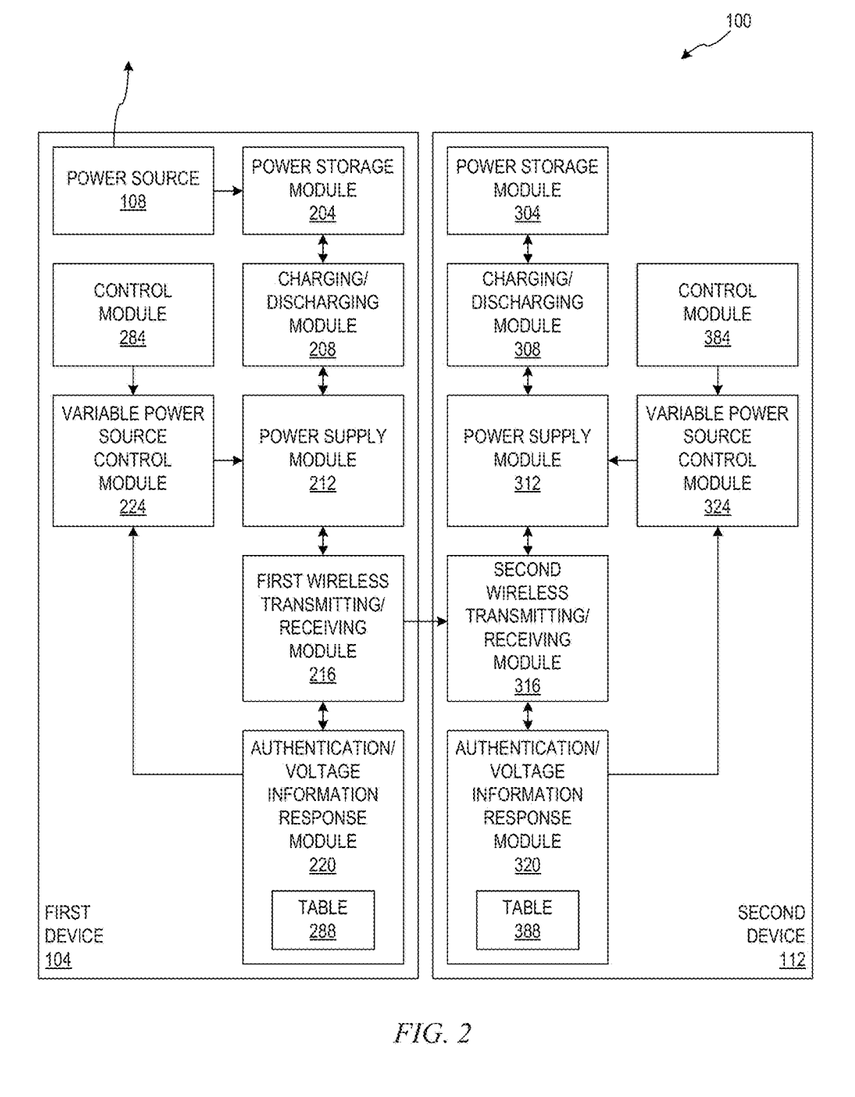
FIG. 2 is a block diagram of the wireless charging system according to an embodiment of the present invention.

The first device 104 has therein a first wireless transmitting/receiving module 216 (see FIG. 2). The first wireless transmitting receiving module 216 has a transmission coil (not shown) whereby wireless transmission takes place. The second device 112 has therein a second wireless transmitting/receiving module 316 (see FIG. 2). The second wireless transmitting/receiving module 316 has a transmission coil (not shown) conducive to wireless transmission in conjunction with the transmission coil of the first wireless transmitting/receiving module 216 of the first device 104. In fact, under different conditions and requirements, the first device 104 carried out charging in different ways, and related details and operation are described and explained later.

Referring to FIG. 1, after the alternating current power source 108 has been electrically coupled to the first device 104 (for example, after the plug has been plugged in the power source socket), the first device 104 of the wireless charging system 100 acquires a chargeable radius 124 within which the first device 104 charges devices one by one. Hence, the first device 104 charges any devices within the chargeable radius 124 of the first device 104, such as the second device 112, a device 116, and a device 120. The first device 104 cannot charge any devices outside the chargeable radius 124 of the first device 104, such as a device 132, a device 136, a device 140, or a device 144. The first device 104 enters into a battery mode in the event that: the power source 108 has not yet been plugged in the first device 104; the power source 108 gets damaged; or the power source 108 does not supply power to the first device 104 for any reason. In the battery mode, the first device 104 has a short charging radius, which is exemplified by a chargeable radius 126 in this embodiment, for use in performing a wireless charging process. Hence, a device within the chargeable radius 126 of the first device 104, namely the second device 112, is wirelessly charged, whereas devices outside the chargeable radius 126 of the first device 104, such as the device 116, the device 120, the device 132, the device 136, the device 140, or the device 144, cannot be charged by the first device 104. As mentioned before, wireless charging is effectuated by inductive coupling or another related technique and adapted to transfer energy from a power supplying apparatus (such as the first device 104) to a power receiving apparatus (such as the second device 112) to enable the power receiving apparatus (the second device 112) to use the received energy in charging its battery and performing its operation. Energy is transferred between the first device 104 and the second device 112 by inductive coupling to not only advantageously dispense with any electrical wire which might otherwise be required to connect the first device 104 and the second device 112 but also advantageously charge the second device 112 in the absence of any exposed conductive contact of the second device 112.

In the embodiment illustrated with FIG. 1, the power source 108 supplies power to the first device 104 such that the transmission coil of the first device 104 generates a radiating field for enabling energy transfer, wherein the transmission coil of the second device 112 is coupled to the radiating field to generate and output power to a power storage module 304 of the second device 112 (see FIG. 2) or another device for storing or consuming power.

Referring to FIG. 2, there is shown a schematic block diagram of the wireless charging system 100 according to an embodiment of the present invention. The wireless charging system 100 illustrated with FIG. 2 further comprises the first device 104 and the second device 112. The embodiment illustrated with FIG. 1 merely serves an illustrative purpose, wherein the device 104, device 112, device 116, device 120, device 132, device 136, device 140, and device 144 are a handheld electronic device, desktop computer, notebook computer, cellular phone, tablet computer, digital camera, personal digital assistant (PDA), Walkman, projector, consumer electronic product, and computer peripheral device, respectively, but the present invention is not limited thereto.

The first device 104 comprises a control module 284 and a memory (not shown). The second device 112 comprises a control module 384 and a memory (not shown). The control module 284 and the control module 384 are each, for example, a microprocessor for controlling the general operation of the first device 104 and the second device 112, respectively. In an embodiment of the present invention, the operation includes but is not limited to wireless electric charging operation, voice communication operation, and data communication operation. The memories of the first device 104 and the second device 112 mainly store software programs (for use in performing control, operation, and processing through the control module 284 and the control module 384, respectively) and related data.

The block diagram of the functional framework of the wireless charging system 100 in FIG. 2 is illustrative of power line communication (PLC) functioning as a communication medium. The control module 284 and the control module 384 interpret frames sent from/received by the first wireless transmitting/receiving module 216 and the second wireless transmitting/receiving module 316; in response to the frames being control frames for controlling the wireless charging system 100, the control module 284 and the control module 384 perform an appropriate corresponding processing process.

The first device 104 further comprises a power storage module 204, a charging/discharging module 208, a power supply module 212, the first wireless transmitting/receiving module 216, an authentication/voltage information response module 220, the control module 284, and a variable power source control module 224. The second device 112 comprises a power storage module 304, a charging/discharging module 308, a power supply module 312, the second wireless transmitting/receiving module 316, an authentication/voltage information response module 320, the control module 384, and a variable power source control module 324. Not reiterated hereunder are those which are described above, including the first wireless transmitting/receiving module 216 of the first device 104 and the transmission coil thereof, the second wireless transmitting/receiving module 316 of the second device 112 and the transmission coil thereof, the power source 108, the power source cable, the power source socket, the control module 284, and the control module 384.

In the preferred embodiment illustrated with FIG. 2, in general, the power supply module 212 and the power supply module 312 are built in the first device 104 and the second device 112, respectively, for providing power sources required for device operation. The power source 108 is, for example, provided in the form of an alternating current power source or grid electricity, but the present invention is not limited thereto. After the plug has been plugged in the power source socket and the alternating current power source 108 is supplying power well, the alternating current power source 108 is converted into a direct current voltage source through the power source conversion unit, wherein the direct current voltage source supplies power to the power storage module 204 such that power is stored therein. The stored power can be supplied to the power supply module 212 through the charging/discharging module 208. After the plug has been removed from the power source socket or the alternating current power source 108 fails or malfunctions and thus is incapable of supplying power normally, the power source 108 is unable to supply power to the power storage module 204.

Regarding the first device 104, the charging/discharging module 208 is electrically coupled to the power storage module 204, whereas the power supply module 212 is electrically coupled to the charging/discharging module 208, and the first wireless transmitting/receiving module 216 is electrically coupled to the power supply module 212. The charging/discharging module 208 and the power storage module 204 work together to perform the charging and discharging operation. The variable power source control module 224 is adapted to variably provide power sources of different power ratings and electrically coupled to the power supply module 212, the control module 284, and the authentication/voltage information response module 220. The authentication/voltage information response module 220 is adapted to perform an authentication process pertaining to the wireless electric charging between the first device 104 and the second device 112 as well as the other functions and electrically coupled to the first wireless transmitting/receiving module 216 and the variable power source control module 224.

Regarding the second device 112, the charging/discharging module 308 is electrically coupled to a power storage module 304, whereas a power supply module 312 is electrically coupled to the charging/discharging module 308, and the second wireless transmitting receiving module 316 is electrically coupled to the power supply module 312. The charging/discharging module 308 and the power storage module 304 work together to perform the charging and discharging operation. The variable power source control module 324 is electrically coupled to the power supply module 312, the control module 384, and the authentication/voltage information response module 320 and adapted to variably provide power sources of different power ratings. The authentication/voltage information response module 320 is electrically coupled to the second wireless transmitting/receiving module 316 and the variable power source control module 324 and adapted to perform an authentication process pertaining to the wireless electric charging between the first device 104 and the second device 112 as well as the other functions.

In conclusion, the first device 104 is supplied with power from the power source 108 such that, according to the aforesaid technical disclosure, the first device 104 wirelessly charges the second device 112. The first wireless transmitting receiving module 216 and the second wireless transmitting receiving module 316 perform a wireless receiving process and a wireless transmitting process whereby power is transmitted wirelessly from the first device 104 to the second device 108 and stored therein (in other words, the first device 104 is discharging, whereas the second device 108 is being charged). Conversely, when the second device 112 is supplied with power from the power source 108 plugged in the second device 112, the second device 112 wirelessly transmits power to the first device 104 (that is, the second device 108 is discharging, and the first device 104 is being charged) so as to store the power in the first device 104.

The components of the wireless charging system 100, such as the first device 104, the second device 112, the devices 116, 120, 132, 136, 140, and the power source 108, are not necessarily provided in the form of specific hardware or software. In practice, in the other embodiments of the present invention, the components of the wireless charging system 100 are provided in the other forms and still achieve the aforesaid intended functions. The wireless charging system/method of the present invention are not limited to the aforesaid charging mechanism or technology.

Figure 3:
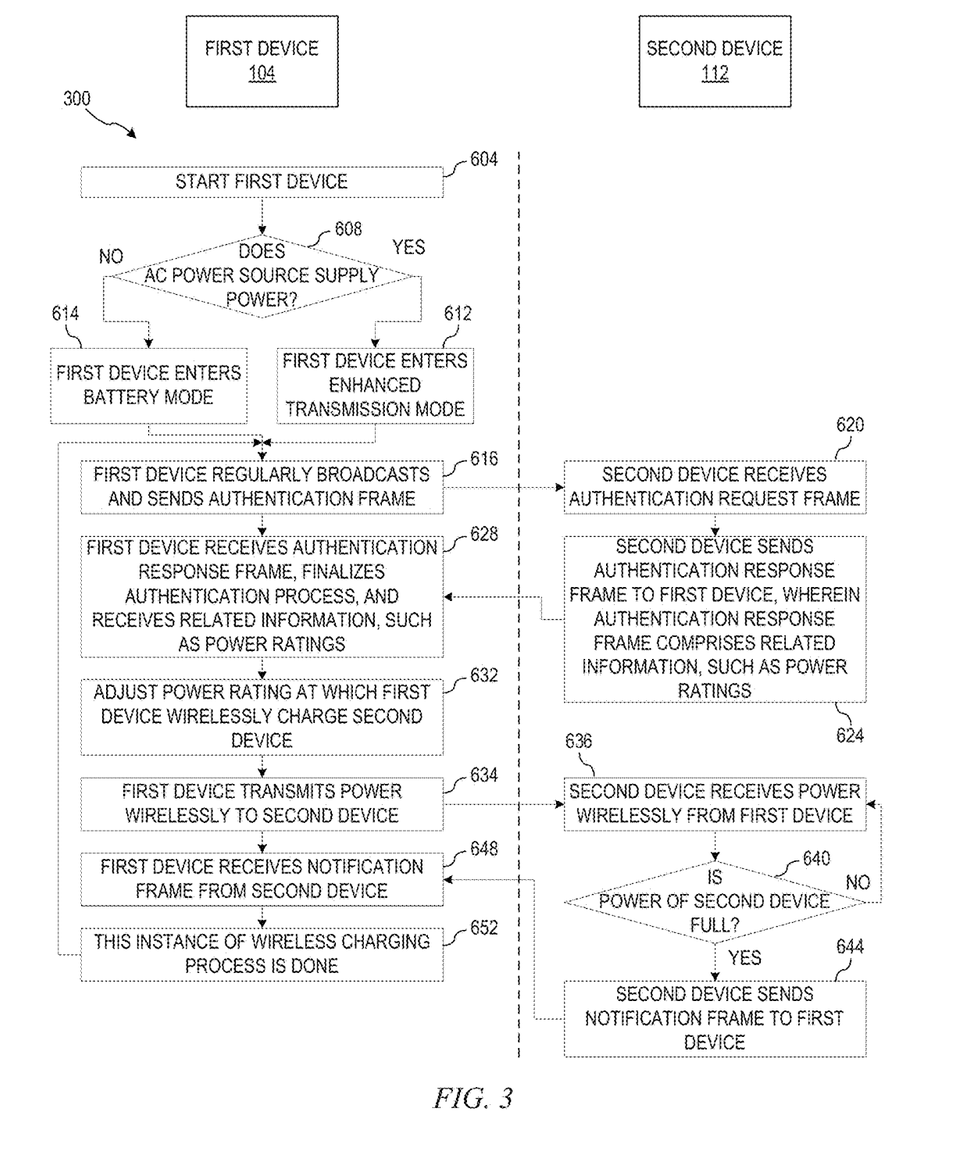
FIG. 3 is a flowchart of a wireless charging method according to an embodiment of the present invention.

The method for the first device 104 to wirelessly charge the second device 112 according to an embodiment of the present invention is described hereunder and illustrated with the framework depicted FIG. 1 and FIG. 2 and the flowchart shown in FIG. 3. A wireless charging method 300 for use between the first device 104 and the second device 112 according to a preferred embodiment of the present invention is illustrated with FIG. 3. The process flow of the method 300 comprises steps as follows:

Step 604: start a power source of the first device 104, that is, start the first device 104, Step 608: the control module 284 checks whether the power source 108 supplies power to the first device 104. If the power source 108 supplies power to the first device 104, the process flow of the method 300 goes to step 612 in which the first device 104 enters into an enhanced transmission mode. If the power source 108 does not supply power to the first device 104, the process flow of the method 300 goes to step 614 in which the first device 104 enters into a battery mode, wherein the external power source 108 does not supply power, and thus wireless charging is carried out by the power storage module 204. According to an embodiment of the present invention, the power source 108 is an alternating current power source, wherein, under normal operation condition of the power source 108, the power source 108 begins supplying power to the first device 104 as soon as the power source 108 is plugged in the first device 104.

Step 612: in response to the power source 108 supplying power to the first device 104, the control module 284 has the first device 104 enter into the enhanced transmission mode. With the power source 108 supplying power to the first device 104, the first device 104 provides a larger amount of power, thereby increasing the quantity of the devices to be wirelessly charged by the first device 104. It's thus determined that the first device 104 enters the enhanced transmission mode. Referring to FIG. 1, the chargeable radius 124 (shown by a dashed straight line) indicates a chargeable radius of the enhanced transmission mode. The magnitude of the chargeable radius 124 can be configured according to various needs and environments. If the power source 108 has not yet been plugged in the first device 104, the power source 108 gets damaged, or the power source 108 does not supply power to the first device 104 for some reason, the first device 104 will operate at the battery mode and with a short charging radius, such that wireless charging takes place at the battery mode and with the chargeable radius 126 (solid straight line), wherein the chargeable radius 126 is shorter than the chargeable radius 124.

Figure 4A:
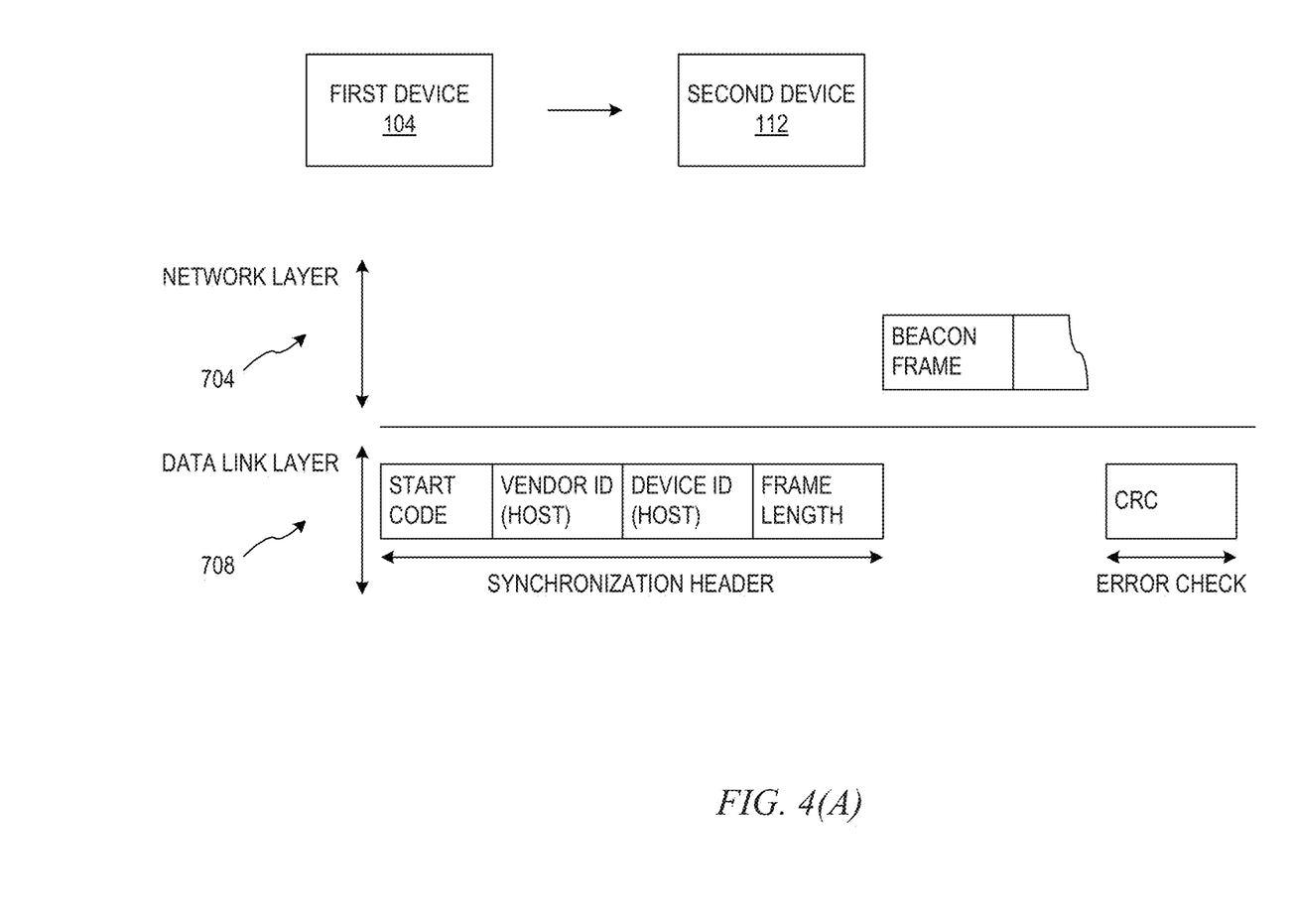
FIG. 4(A) is a schematic view of details of an authentication request a e according to an embodiment of the present invention.

Step 616: the control module 284 causes the first device 104 to regularly broadcast and send an authentication request frame, wherein the authentication request frame has a first ID and the other information. The first ID comprises a vendor ID and a device ID, but the present invention is not limited thereto. According to an embodiment of the present invention, the first ID includes but is not limited to the device ID and the vendor ID of the first device 104 in order to communicate with the second device 112. With the authentication request frame, the first device 104 informs devices other than the first device 104 of its presence. For the formats and details of the authentication request frame, refer to FIG. 4 (A) and a description thereof.

Step 620: the second device 112 receives the authentication request frame from the first device 104 through the second wireless transmitting/receiving module 316. According to an embodiment of the present invention, for example, the first device 104 and the second device 112 store in the authentication/voltage information response module 220 and the authentication/voltage information response module 320, respectively, recognized ID tables (or known as device directory tables) 288, 388, and recognized ID of devices which can communicate with the first device 104 and the second device 112, respectively. For instance, the recognized ID tables 288, 388 are stored in a storage unit (not shown) of the authentication/voltage information response module 220 and a storage unit (not shown) of the authentication/voltage information response module 320, respectively, but the present invention is not limited thereto. With the recognized ID table 388, the second device 112 receives the authentication request frame as well as identifies and recognizes the first ID of the first device 104. For example, if the recognized ID table 388 of the second device 112 contains the ID of the first device 104, the second device 112 will receive and identify the authentication request frame from the first device 104.

Figure 4B:
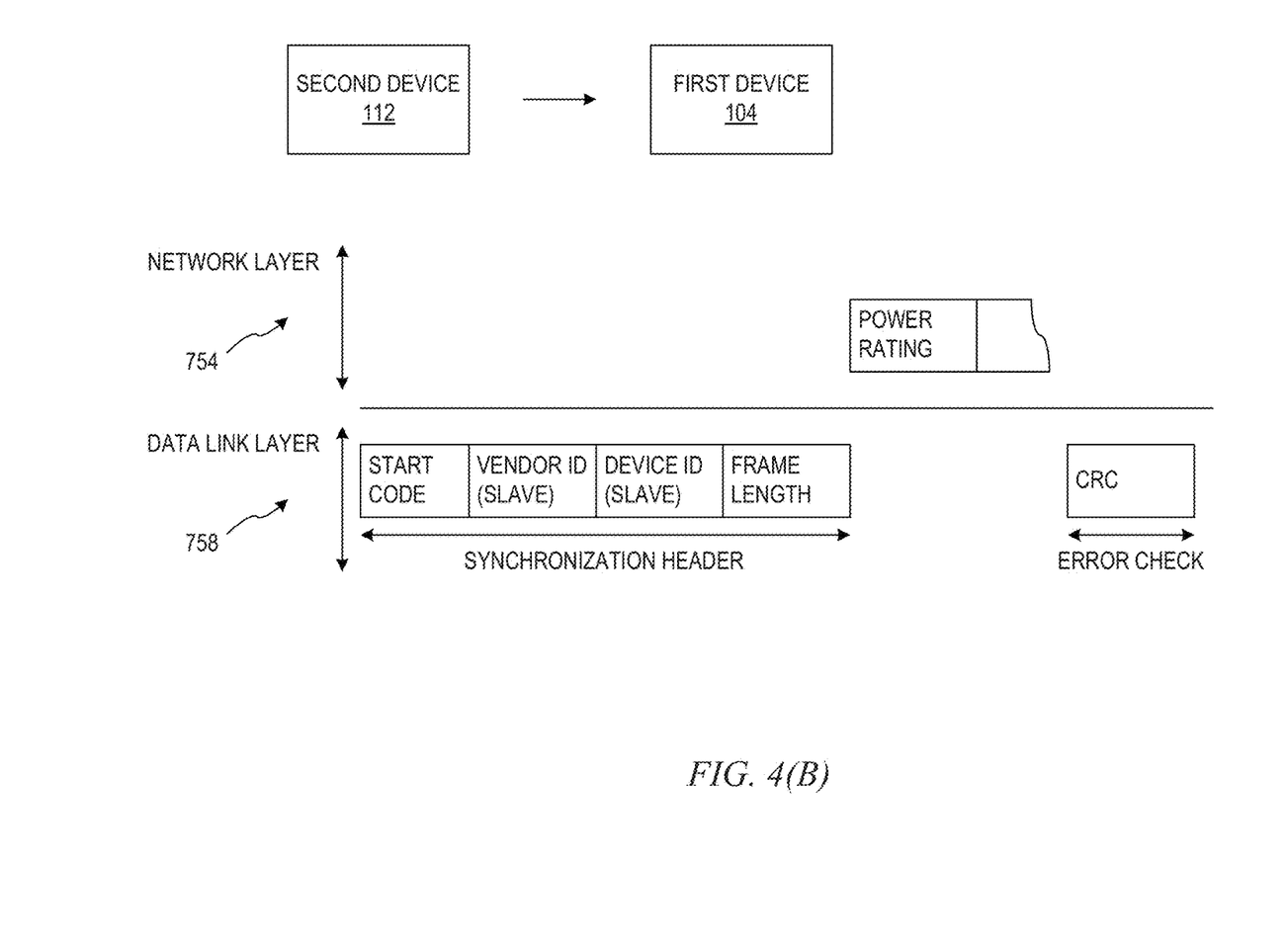
FIG. 4(B) is a schematic view of details of the authentication response frame according to an embodiment of the present invention.

Step 624: in response to the authentication request frame from the first device 104 and related identification and recognition, the control module 384 causes the second device 112 to send an authentication response frame through the second wireless transmitting/receiving module 316, wherein the authentication response frame comprises a second ID of the second device 112. According to an embodiment of the present invention, the second. ID includes but is not limited to the device ID and the vendor ID of the second device 112. The authentication response frame further contains other related data, for example, the power rating of the second device 112, but the present invention is not limited thereto, For the format and details of the authentication response frame, refer to FIG. 4 (B) and a description thereof.

Step 628: in response to the authentication response frame sent from the second device 112, the control module 284 causes the first device 104 to receive through the first wireless transmitting/receiving module 216 the authentication response frame from the second device 112. Similarly, with the recognized ID table 288 of the first device 104, the first device 104 receives the authentication response frame of the second device 112 and then identifies and recognizes the authentication response frame. For example, if the recognized ID table 288 of the first device 104 contains the ID of the second device 112, the first device 104 will receive and identify the authentication response frame from the second device 112 and information related to the second device 112, including but not limited to the power rating of the second device 112. Upon completion of step 628, the first device 104 finalizes the authentication process and receives its related information, such as power ratings, so as to determine the power rating to be sent from the first device 104 to the second device 112.

Step 632: in response to information pertaining to the power rating of the second device 112, the control module 284 causes the first device 104 to adjust according to power rating-related information the power rating at which the first device 104 wirelessly charges the second device 112. The power rating at which the first device 104 wirelessly charges the second device 112 is adjusted by the variable power source control module 224. For the configuration and details of the variable power source control module 224, refer to FIG. 5 and a description thereof.

Step 634: to transmit power at the adjusted power rating of wireless charging, the first device 104 transmits power wirelessly to the second device 112 through the first wireless transmitting/receiving module 216 and the second wireless transmitting/receiving module 316, respectively.

Step 636: the second device 112 receives power wirelessly from the first device 104.

Step 640: a checking mechanism (not shown) of the second device 112 checks whether wireless charging has been carried out to a predetermined extent, for example, the power storage module 304 has become full. If the power storage module 304 of the second device 112 has become full, the process flow of the method 300 goes to step 644. If the power storage module 304 of the second device 112 has not yet become full, the process flow of the method 300 goes to step 636 to repeat the subsequent steps.

Step 644: in response to wireless charging having been carried out to a predetermined extent, for example, the power storage module 304 has become full, the control module 384 causes the second device 112 to send a notification frame, wherein the notification frame comprises a message which informs the first device 104 that the second device 112 has already been charged.

Step 648: the first device 104 receives the notification frame from the second device 112.

Step 652: this instance of the wireless charging process is done, and the process flow of the method goes to step 616 for regularly broadcasting and sending a beacon frame. Afterward, the device to be charged, such as the device 116 or the device 120, is wirelessly charged in sequence during the related aforesaid steps.

In a subsequent step, for example, a typical subsequent system operation is performed. All the aforesaid steps are implemented by means of hardware, firmware (i.e., a combination of a computer command and a hardware device, wherein data in the hardware device is software data), or a system. The other basic frameworks and components of the electronic device 100 can refer to those of conventional cellular phones, tablet computers, notebook computers, and desktop computers; hence, details not related to the present invention are omitted from the description herein.

FIG. 4 (A) depicts the format and details of an authentication request frame according to an embodiment of the present invention. The authentication request frame sent from the first device 104 to the second device 112 not only comprises a data link layer 708 which has a start code, a vendor ID, a device ID, a frame length (which are attributed to the contents of a synchronization header), and cylic redundancy check (CRC) for an illustrative purpose, but also comprises a network layer 704 which has a beacon frame for an illustrative purpose. The cylic redundancy check is mainly for use in data error check in the event of accidental frame data change. The beacon frame defines the boundary of communication sessions and a specific guarantee time slot.

FIG. 4 (B) depicts the format and details of the authentication response frame according to an embodiment of the present invention. The authentication response frame sent from the second device 112 to the first device 104 not only comprises a data link layer 758 which has the start code, the vendor ID, the device ID, the frame length (which are attributed to the contents of the synchronization header), and cylic redundancy check for an illustrative purpose, but also comprises a network layer 754 which has a Power Rating for an illustrative purpose. Similarly, the cylic redundancy check is mainly for use in data error check in the event of accidental frame data change. The beacon frame defines the boundary of communication sessions and a specific guarantee time slot.

Figure 5:
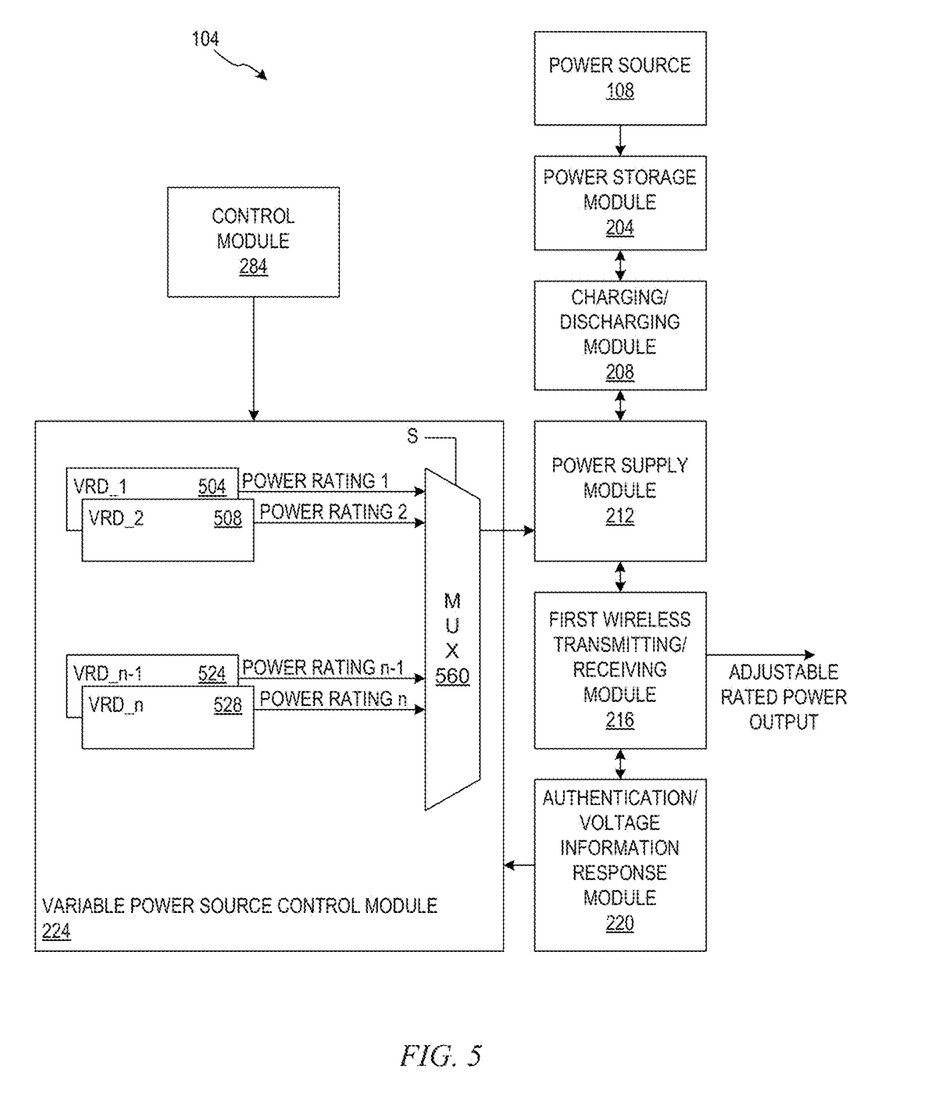
FIG. 5 is a block diagram of a variable power source control module according to an embodiment of the present invention.

Referring to FIG. 5, there is shown a block diagram of the variable power source control module 224, as illustrated in FIG. 2, of the first device 104 according to an embodiment of the present invention. The variable power source control module 224 comprises a plurality of voltage modulation modules VRD_1 504, VRD_2 508 through VRD_n−1 524, VRD_n 528 with power ratings PR_1, PR_2 through PR_n−1, PR_n. The voltage modulation modules are electrically coupled to a multiplexer 560. In response to information pertaining to the power rating sent from the second device 112, appropriate power ratings are provided by selecting appropriate voltage modulation modules, that is, selecting a pin and the control module 284.

Smart wireless electric charging implemented with the system of the present invention is advantageously characterized by easy and low-cost configuration and operation, real-time charging in any environment, ease of operation, ease of use, and enhanced user-friendliness Although the aforesaid embodiments illustrate a structure whereby smart wireless electric charging is effectuated by PLC, persons skilled in the art can easily infer other related structures. Moreover, although the variable power source control module 224 in the aforesaid embodiments comprises voltage modulation modules and a multiplexer, persons skilled in the art can easily infer other related constituent elements.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

What is claimed is:

1. An apparatus comprising:
   a wireless charging module for wirelessly charging a power storage module of an external device;
   a control module in communication with the wireless charging module;
   an internal power storage module for supplying power to the wireless charging module and the control module; and
   a power source connector for selectively coupling to an external power source;
   the control module for enabling the wireless charging module to provide wireless charging over a first chargeable radius in response to detecting that the internal power storage module is not receiving power from an external power source and for enabling the wireless charging module to provide wireless charging over a second chargeable radius in response to detecting that the internal power storage module is receiving power from the external power source, wherein the second chargeable radius is greater than the first chargeable radius.

2. The apparatus of claim 1, wherein the wireless charging module includes a transmission coil that converts a voltage into an electromagnetic field for wirelessly charging the power storage module of the external device.

3. The apparatus of claim 2, wherein the transmission coil converts an externally applied electromagnetic field into a voltage for charging the internal power storage module.

4. The apparatus of claim 2, further comprising:
   memory for storing program instructions, wherein the control module includes a microprocessor for processing the program instructions to control operation of the transmission coil to send a control frame in the electromagnetic field.

5. The apparatus of claim 4, wherein the control frame is an authentication request frame, the microprocessor for further processing the program instructions to receive an authentication response frame from the external device via the transmission coil.

6. The apparatus of claim 5, wherein the authentication response frame identifies a power rating for the external device, the microprocessor for further processing the program instructions to control the wireless charging module to wirelessly charge the external device at the identified power rating.

7. The apparatus of claim 5, the microprocessor for further processing the program instructions to:
   wirelessly charge a power storage module of a second external device within the enabled chargeable radius of the wireless charging module.

8. The apparatus of claim 4, the microprocessor for further processing the program instructions to:
   receive a notification frame from the external device indicating that the power storage module of the external device is fully charged; and
   control the wireless charging module to stop wirelessly charging the external device.

9. The apparatus of claim 2, wherein the transmission coil converts an electromagnetic field from an external source to a voltage for charging the internal power storage module.

10. The apparatus of claim 1, wherein the wireless charging involves inductive coupling of the wireless charging module to a wireless charging module of the external device.

11. The apparatus of claim 1, wherein the internal power storage module is the only power source used for wireless charging over the first chargeable radius.

12. The apparatus of claim 1, further comprising:
    a power source conversion unit operatively coupled between the power source connector and the internal power storage module for converting alternating current from the external power source into direct current and providing the direct current to the internal power storage module.

13. The apparatus of claim 1, wherein the apparatus is selected from a handheld electronic device.

14. The apparatus of claim 1, wherein the apparatus is selected a desktop computer, a notebook computer, a cellular phone, a tablet computer, a digital camera, and a personal digital assistant.

15. The apparatus of claim 1, wherein the wireless charging module charges the power storage module of any external device having a wireless charging module within the enabled chargeable radius.

16. The apparatus of claim 1, further comprising:
    memory for storing program instructions, wherein the control module includes a microprocessor for processing the program instructions to control the wireless charging module.

17. A method, comprising:
operating a first device in a first charging mode that will wirelessly charge an external device within a first chargeable radius from the first device in response to the first device not receiving power from an external power source; and
operating the first device in a second charging mode that will wirelessly charge an external device within a second chargeable radius from the first device in response to the first device receiving power from the external power source, wherein the second chargeable radius is larger than the first chargeable radius.

18. The method of claim 17, wherein the first charging mode includes a battery mode, and the second charging mode includes an enhanced transmission mode, the battery mode dispensing with the external power source and performing the wireless charging with a power storage module of the first device, and the enhanced transmission mode using the external power source to wirelessly charge more devices than the battery mode.

19. The method of claim 17, further comprising:
broadcasting and sending an authentication request frame from the first device regularly, wherein the authentication request frame has a first ID;
recognizing the first ID by the second device, in response to receipt of the authentication request frame by the second device;
sending an authentication response frame from the second device in response to recognition of the first ID by the second device, wherein the authentication response frame has a second ID and information pertaining to a power rating of the second device;
recognizing the second ID by the first device, in response to receipt of the authentication response frame by the first device; and
adjusting by the first device the power rating at which the first device wirelessly charges the second device in response to recognition of the second ID by the first device and in accordance with information pertaining to the power rating of the second device.

20. The method of claim 17, wherein the first device and the second device each comprise one of a handheld electronic device, a desktop computer, a notebook computer, a cellular phone, a tablet computer, a digital camera, a personal digital assistant (PDA), a Walkman, a projector, a consumer electronic product, and a computer peripheral device.

* * * * *